United States Patent [19]

Florindi et al.

[11] Patent Number: 5,898,771

[45] Date of Patent: Apr. 27, 1999

[54] METHOD AND APPARATUS FOR UNIVERSAL TELEPHONE OPERATOR SERVICE

[75] Inventors: Robert P. Florindi, Springfield, N.J.; Reggie McKoy, Silver Spring, Md.; Robert D. Farris, Sterling, Va.

[73] Assignee: Bell Atlantic Network Services, Inc., Arlington, Va.

[21] Appl. No.: 08/803,701

[22] Filed: Feb. 21, 1997

[51] Int. Cl.[6] .............................. H04M 3/60; H04M 3/42

[52] U.S. Cl. .................... 379/260; 379/146; 379/207; 379/220; 379/223

[58] Field of Search ..................... 379/260, 267, 379/188, 189, 201, 211, 146, 147, 154, 155, 114, 115, 207, 223, 229, 228, 230, 219, 220, 221

[56] References Cited

U.S. PATENT DOCUMENTS

| | | | |
|---|---|---|---|
| 4,054,756 | 10/1977 | Comella et al. | 379/223 |
| 4,922,519 | 5/1990 | Daudelin | 379/122 |
| 5,008,929 | 4/1991 | Olsen et al. | 379/115 |
| 5,046,183 | 9/1991 | Dorst et al. | 379/144 |
| 5,131,027 | 7/1992 | Hird et al. | 379/144 |
| 5,163,083 | 11/1992 | Dowden et al. | 379/223 |
| 5,181,237 | 1/1993 | Dowden et al. | 379/223 |
| 5,210,789 | 5/1993 | Jeffus et al. | 379/260 |
| 5,222,120 | 6/1993 | McLeod et al. | 379/196 |
| 5,278,895 | 1/1994 | Carlson | 379/146 |
| 5,339,352 | 8/1994 | Armstrong et al. | |
| 5,515,425 | 5/1996 | Penzias et al. | 379/113 |
| 5,586,171 | 12/1996 | McAllister et al. | 379/106.02 |
| 5,684,866 | 11/1997 | Florindi et al. | 379/114 |
| 5,729,599 | 3/1998 | Plomondon et al. | 379/189 |
| 5,793,839 | 8/1998 | Farris et al. | 379/188 |

*Primary Examiner*—Scott Wolinsky
*Attorney, Agent, or Firm*—McDermott, Will & Emery

[57] ABSTRACT

A local exchange carrier can provide operator service for a telephone call, whether intra-LATA or not, and in some cases to perform the service so that the call can be passed with the service already provided. Operator services for calls that require prior approval at a subscriber station for completion and those that do not (e.g., collect calls vs. credit card calls) are differentiated. If, for a particular call, it is determined that the required operator service does not require prior approval for the call being placed, then the operator service is provided from the end-office without routing the call to an operator services platform. The call may be serviced using an advanced intelligent network (AIN) system. If the required operator service does require prior approval, however, it is ultimately routed to an operator services platform of the local exchange carrier or interexchange carrier for provision of the service.

48 Claims, 8 Drawing Sheets

METHOD AND APPARATUS FOR UNIVERSAL TELEPHONE OPERATOR SERVICE

CROSS-REFERENCE TO RELATED APPLICATIONS

This application relates to an application of Robert P. Florindi et al., assigned to the assignee of the present invention, entitled "METHOD AND APPARATUS FOR ACCESS TO TELEPHONE OPERATOR SERVICES", U.S. Ser. No. 08/398,938, filed Mar. 3, 1995 and issued as U.S. Pat. No. 5,684,866 on Nov. 4, 1997.

TECHNICAL FIELD

The present invention relates generally to the provision of certain telephone operator services and particularly to the provision of these services for both local and long distance calls by use of an advanced intelligent network and its related signaling system.

BACKGROUND ART

Certain telephone calls require the services of an operator for completion. Although these services have evolved through the performance of human operators, and although they are still generally thought of in those terms, the technology has advanced to the point where it is now commonplace for operator services to be fully automated. Any one of the various kinds of calls that require operator services for completion can now be provided without human intervention. Among these are "alternate billing" calls, person-to-person calls, and calls from pay phones which are to be paid for in advance as "coin-paid" calls. With alternate billing, for a particular call, the charges for the call are arranged to be billed to an account for a telephone other than the one from which the call originates. Alternate billing calls include collect calls, calls for billing to a third party, and credit card calls.

Generally, a local exchange carrier (LEC) is responsible for providing operator services for intra-LATA calls carried within its network (within a "local access transport area" or LATA), and an interexchange carrier (IXC) is responsible for providing operator services for calls carried by its network. In the latter case, as with most other calls, operator service calls typically originate with a local exchange carrier and they are passed through by the LEC to the interexchange carrier's network. This occurs without the local exchange carrier involving itself in the provision of operator services, and it remains then for the IXC to make those services available if they are needed. In either case, whether the services are provided for a local call or for a long distance call, the call is typically routed, by the responsible carrier, from or within its network, to an operator services platform that is deployed for providing the needed services.

Since most calls, both long distance and intra-LATA, are received in the first instance by a local exchange carrier, it has been suggested that operator services for both kinds of calls can be provided by operator service platforms (e.g., operator service centers) of the local exchange carriers. One deterrent to such an arrangement is that special operator service trunks have been needed in order to route calls to these platforms. A solution for dealing with that, however, is disclosed in the application of Robert P. Florindi et al., identified above. Even with the solution offered by the disclosure of that application, however, it remains necessary for the LEC to first pass long distance calls in need of operator services to the interexchange carrier network, and for the IXC to then forward them to an operator service platform of the local exchange carrier that is engaged to provide the services.

Thus, notwithstanding the improvements that have been made, operating efficiencies would be expected if a local exchange carrier that initially receives calls could provide at least some of the operator services, as required, before passing the calls to an interexchange carrier, and if the processes and techniques used to service the long distance calls (e.g., inter-LATA) could be used by the LEC for providing the same kinds of services for its intra-LATA calls. For those services carried out in advance of moving a call to the IXC network, the operator services desirably would be transparent to the interexchange carrier and it would receive the call as it does any other call not requiring operator services. In other words, the call, in those cases, could be received and processed by the IXC essentially as a "plain old telephone service" (POTS) call, having already received operator service processing by the LEC. In that kind of arrangement, the LEC would necessarily be responsible for certain billing and record keeping aspects related to the call processing.

An objective of the present invention, therefore, is to provide a method and apparatus by which operator services can be furnished for both intra-LATA and inter-LATA calls, and by which at least some of the services can be performed by a local exchange carrier for its own, intra-LATA calls and for inter-LATA calls before they are passed to an interexchange carrier. In certain aspects, the invention is facilitated by the application of advanced intelligent network (AIN) operating principles and by utilizing an AIN architectural framework and signaling system.

DISCLOSURE OF THE INVENTION

Certain operator services require that approval for a call be obtained from someone at a telephone station other than the calling station before the call can be completed to a called station. For example, collect calls, bill-to-third-party calls, and person-to-person calls all require an indication from someone, either at the called station or at a third party station, that a call will be accepted or approved before the operator service will allow it to be completed.

By the method and apparatus of the invention, there is a differentiation between operator services for calls that require prior approval for completion and those that do not. This determines whether the operator service required for a call will be provided by operations carried out within, or through, the end-office or whether the call needs to be passed from the end-office to an operator services platform. In processing the call, a decision is made as to whether the end-office, using an AIN system, can be prevailed upon to provide the needed service or whether the call has to be routed to an operator service platform. If the operator service is provided by the end-office, it is enabled by processing triggers that result in access to a system database for information and data needed for performing the service. Preferably, the end-office is adapted for operation within an advanced intelligent network (AIN) environment. Among the operator services which do not entail routing for prior call approval, and which are therefore amenable to end-office operator services, are credit card calls and coin-paid calls.

If an operator service involves prior approval for call completion, the call is ultimately routed to an operator services platform. If the call is not intra-LATA (e.g., it is an inter-LATA or international call), then it is passed to the appropriate interexchange carrier network from the end-office without the operator service having been provided. If the call is intra-LATA, however, it is directed to an operator services platform that can provide service for those kinds of calls. In either case, as the call is passed to an operator services platform, it carries with it, as associated signaling information, an indication of the particular operator service required. A call received by the IXC in need of operator services is routed to an operator services platform from which the required operator services are provided. The service necessarily entails a call back to another telephone from the operator services platform to seek the approval that a call reaching the platform requires. For most IXC calls, a call seeking approval will be placed back through the IXC network. Once the call is approved the IXC network is signaled by the operator services platform, via an interconnecting signaling system, that the call to the called station can be completed or maintained within the IXC network. If a call is determined to be an intra-LATA call it is routed to an operator services platform that can provide the required service, including the placement of a call out from the platform to determine approval for call completion. If approved, the call is then completed within the local exchange carrier's network to the called station.

If, it is determined that the required operator service is of a type that does not require prior approval for the call being placed (e.g., it is a credit card call or a coin-paid call), then the operator services are provided from the end-office, without routing the call to an operator services platform. In that case, the call is serviced by the end-office switching means, along with any required peripherals (such as announcement units, coin detectors), and by calling upon the facilities, preferably, of an AIN system.

Thus, briefly summarized, in one form, the invention is operative to receive a call at a telephone office switch and determine if the operator service required for the call involves acquiring approval for completion from a subscriber station other than the calling station in order for the call to be completed. If the required operator service is not one for which such approval needs to be secured, then the required operator service is provided by operations performed through the telephone office switch. Those operations generally include (i) suspending processing of the call by the switch; (ii) accessing a database and obtaining information from it for providing the required service; and (iii) resuming processing of the call by the switch using the information obtained from the database to carry out the required operator service. On the other hand, if the required operator service involves acquiring such approval, then the call is directed from the switch to an interexchange carrier network for provision of the required operator service if the call is other than an intra-LATA call and it is directed to a local exchange carrier operator services station from which the service is provided if the call is an intra-LATA call.

BEST MODE FOR CARRYING OUT THE INVENTION

A telephone call requiring the services of an operator for completion can be expected to begin in one of several ways. For one, a caller may dial 0+NPA+the called station's directory number (where NPA is the area code). This is often referred to, in short, simply as a 0+ call. Whether the call requires an interexchange operator or a local exchange operator depends on whether the call is intra-LATA or not. That is automatically determined from the dialed digits following the 0 in essentially the same way that a non-operator call is analyzed to see if it is an intra-LATA call. An interexchange carrier's operator will also be raised for assistance if a caller dials 00. The double 0 distinguishes the request for an interexchange operator from one for a local exchange operator. The latter request is usually signaled (at least initially, following a caller going off-hook) by 0–; that is, a 0 without other digits, allowing a time-out to raise an operator. It will be recognized, of course, that although these inputs are used in most situations, a caller may gain access to operator services in other ways as well. For example, a particular 800 number may be made available for reaching an operator service facility. While these alternative ways of getting to an operator may be used with the invention, for brevity and simplicity, the discussion herein will mostly be in terms of a 0+ call.

Figure 1:
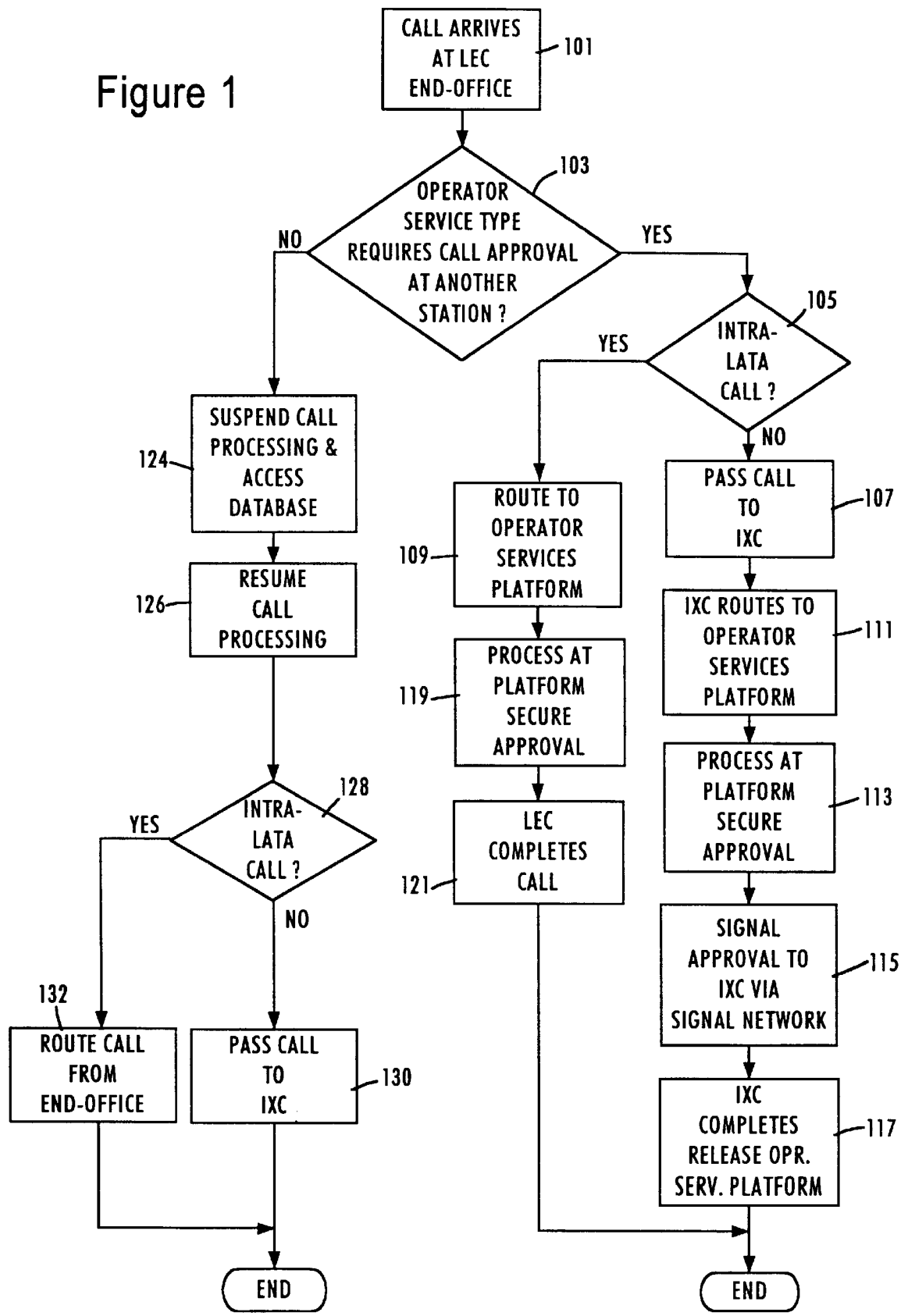
FIG. 1 is a block flow chart illustrating the logical progression of operations carried out by the invention in processing a telephone call.

The logic flow chart of FIG. 1 is referred to initially for explaining certain broad operating concepts of the invention, and for developing an understanding of certain logical operations effectively carried out thereby. Although the flow chart is simplified and greatly condensed, those of ordinary skill in the art will nevertheless readily grasp the inventive features. A more functional, step-by-step, depiction of the inventive process, in a preferred form, is given by FIG. 3, which is to be considered in connection with the architectural framework for the invention shown in FIG. 2.

The process begins, step 101, FIG. 1, when a call requiring operator services arrives from an originating station at an end-office of a local exchange carrier. That operator services are needed is determined from the dialed digits received with the call (as discussed above), from the identity of the calling line, or from a combination of line identity and dialed digits. A call originating from a pay phone, a hotel, or other such institutional phone requiring operator services is identified, for example, from the calling line and the inputs from a caller at the calling station.

Next, considering the overall logic of the process, at step 103, a determination is made as to whether the operator service required (or desired) involves the acquisition of approval for completion of the call at a telephone station other than the calling station. As will be discussed in more detail in connection with FIG. 3, the particular service that is required may be determined by the caller's selection from a menu of available services or from other inputs from the calling telephone (such as might be expected from a pay phone). As is well known, certain operator services require that approval for a call be obtained from someone at a telephone station other than the calling station before the call can be completed to a called station. For example, collect calls, bill-to-third-party calls, and person-to-person calls all require an indication from someone, either at the called station or at a third party station, that each call will be accepted or approved before the operator service will allow it to be completed. For IXC calls of these types, in most cases, there is a necessity, at some point in the processing, to make connection through an IXC network from the operator system to the telephone station at which approval is sought.

Thus, step 103 is important since it differentiates between calls that require prior approval for completion and those that do not. This differentiation determines whether the operator service required for a call will be provided by operations carried out within, or through, the end-office itself or whether the call needs to be passed from the end-office to an operator services platform for that purpose. As will become clear from the ensuing discussion, if the operator service is provided by the end-office, that facility is enabled in its performance by processing triggers that result in access being gained to information and data, from a system database, that is needed for providing the service. Preferably, the end-office is enabled in that regard by its operation within an advanced intelligent network (AIN) environment. In one view, a decision is made in step 103 as to whether the end-office, using an AIN system, can be prevailed upon to provide the needed service or whether the call has to be routed to an operator service platform. Among the operator services which do not entail routing for advanced call approval, and which are therefore amenable to end-office operator services, are credit card calls and coin-pay calls. Notably, if the end-office provides the operator service, then an IXC call can be passed to the IXC network with the operator service having become transparent to the IXC.

If the operator service involves prior approval for call completion, the call is ultimately to be routed to an operator service platform. Following a step 103 determination that a call needs that kind of service, logical step 105 is employed to determine if the call is an intra-LATA call or not. If it is not an intra-LATA call, then, at step 107, the call is passed to the appropriate interexchange carrier network from the end-office without the operator service having been provided. If the call is intra-LATA it is directed by step 109 to an operator services platform that can provide service for those kinds of calls. In either case, as a call is passed to an operator services platform, it carries with it, as associated signaling information, an indication of the particular operator service required. That will have been initially recognized at the end-office and it is needed to enable the operator service platform to respond appropriately.

Preferably, interexchange calls passed to an IXC network without first providing any needed operator services are routed and processed as disclosed in the above-identified application of Robert P. Florindi et al., which, among other things, discloses methodologies that enable a local exchange carrier to receive calls at an operator service platform and provide operator services for an interexchange carrier. Thus, in step 111, an IXC call requiring operator services is routed by the IXC to an operator service platform from which, at step 113, the required operator services are provided. The service of step 113 necessarily entails a call back to another telephone from the operator service platform to seek the approval that calls reaching the platform require. For most IXC calls, a call seeking approval will be placed back through the IXC network. Once the call is approved (e.g., accepted), step 115 is operative to signal to the IXC network that the call to the called station can be completed or maintained, as the case may be, and that is carried out in step 117. Signaling for call approval to the IXC is via a signaling network as disclosed in the Robert P. Florindi et al. application.

Similarly, if a call is determined to be an intra-LATA call at step 105, then step 119 is operative to provide the required service, including the placement of a call out from the platform to determine approval for call completion. If approved, the call is then completed (step 121) within the local exchange carrier's network to the called station.

By contrast, if, at step 103, it is determined that the required operator service is of a type that does not require prior approval for the call being placed (e.g., it is a credit card call or a coin-paid call), then the operator services are to be provided from the end-office, without routing the call to an operator services platform. In that case, the call is serviced by the end-office switching means, along with any required peripherals (such as announcement units, coin detectors), and by calling upon the facilities, preferably, of an AIN system.

In broad outline, by operation of step 124, an end-office switch (the end-office and its structure will be further discussed in connection with FIGS. 2 and 3), equipped to be triggered upon the detection of a need for certain operator services, momentarily suspends its processing of a call and accesses a database for information, data, and commands required for providing the needed operator service. Once the needed information is obtained by the switch it resumes its processing of the call at step 126 and implements any further steps needed to perform the service. For any particular service, a database can be called upon iteratively if needed. As an example, if the call is a coin-paid call, the switching means will collect the called and calling telephone numbers, and, while call processing is suspended, consult a database for the charge rate that is to be applied for the call. With that information in hand, the end-office switch can be set up, using appropriate peripherals, to monitor coin deposits and the need for any additional deposits as the pre-paid calling time is expended.

Next in the logical progression, at step 128 it is determined whether the call being processed is an intra-LATA call or not. If it is not, then it is passed to an interexchange carrier network (step 130) with the operator services already provided by operations carried out within the LEC's end-office, buttressed by end-office access to an AIN database system. On the other hand, if the call is intra-LATA, it is routed from the end-office in conventional fashion within the LEC network (step 132).

Figure 2:
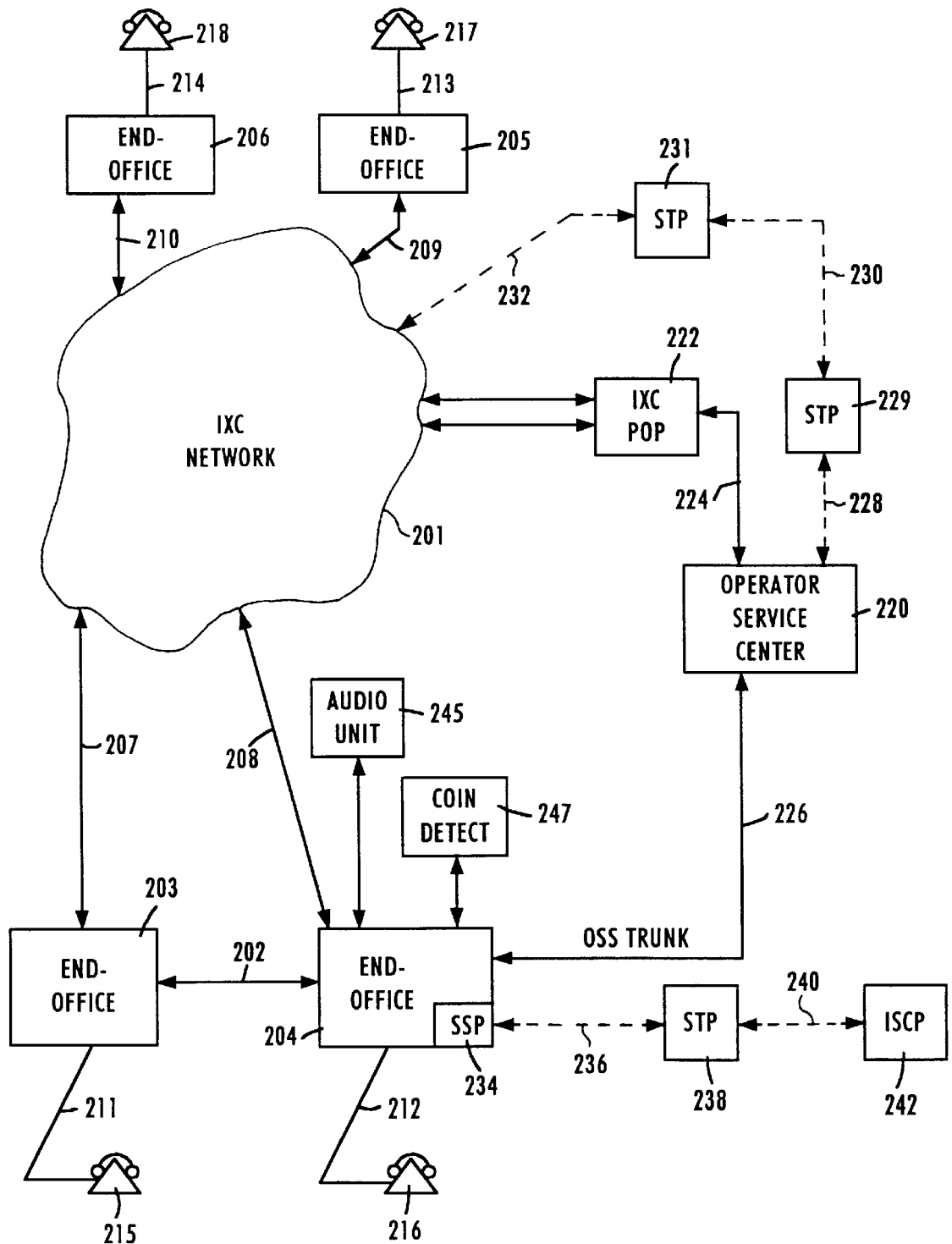
FIG. 2 is a block diagram of a system according to the invention, illustrating the network and architectural framework in which the invention operates.
Figure 3A:
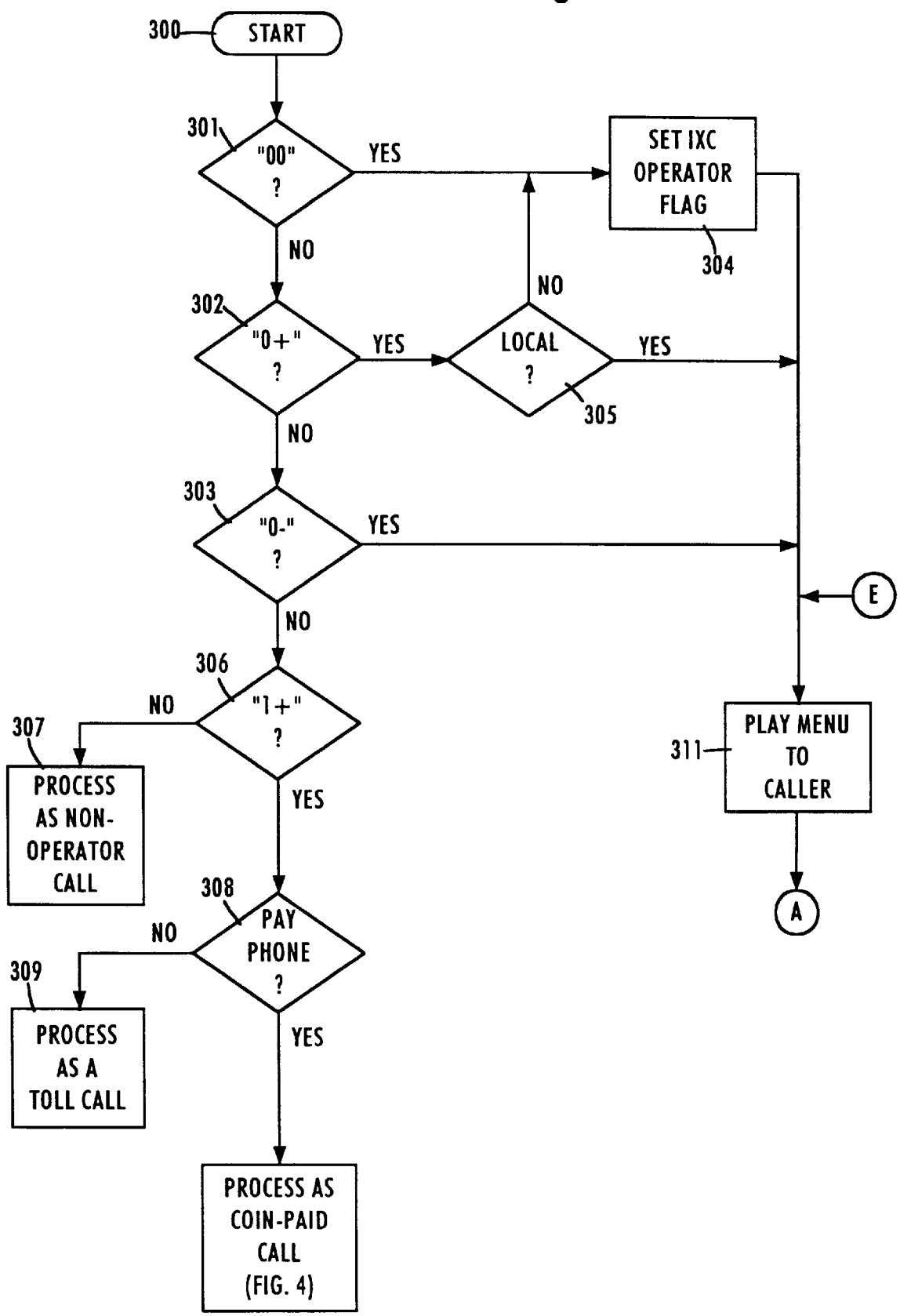
FIGS. 3A–3D taken together, comprise a block flow chart that illustrates operation of the invention in a preferred form.
Figure 3B:
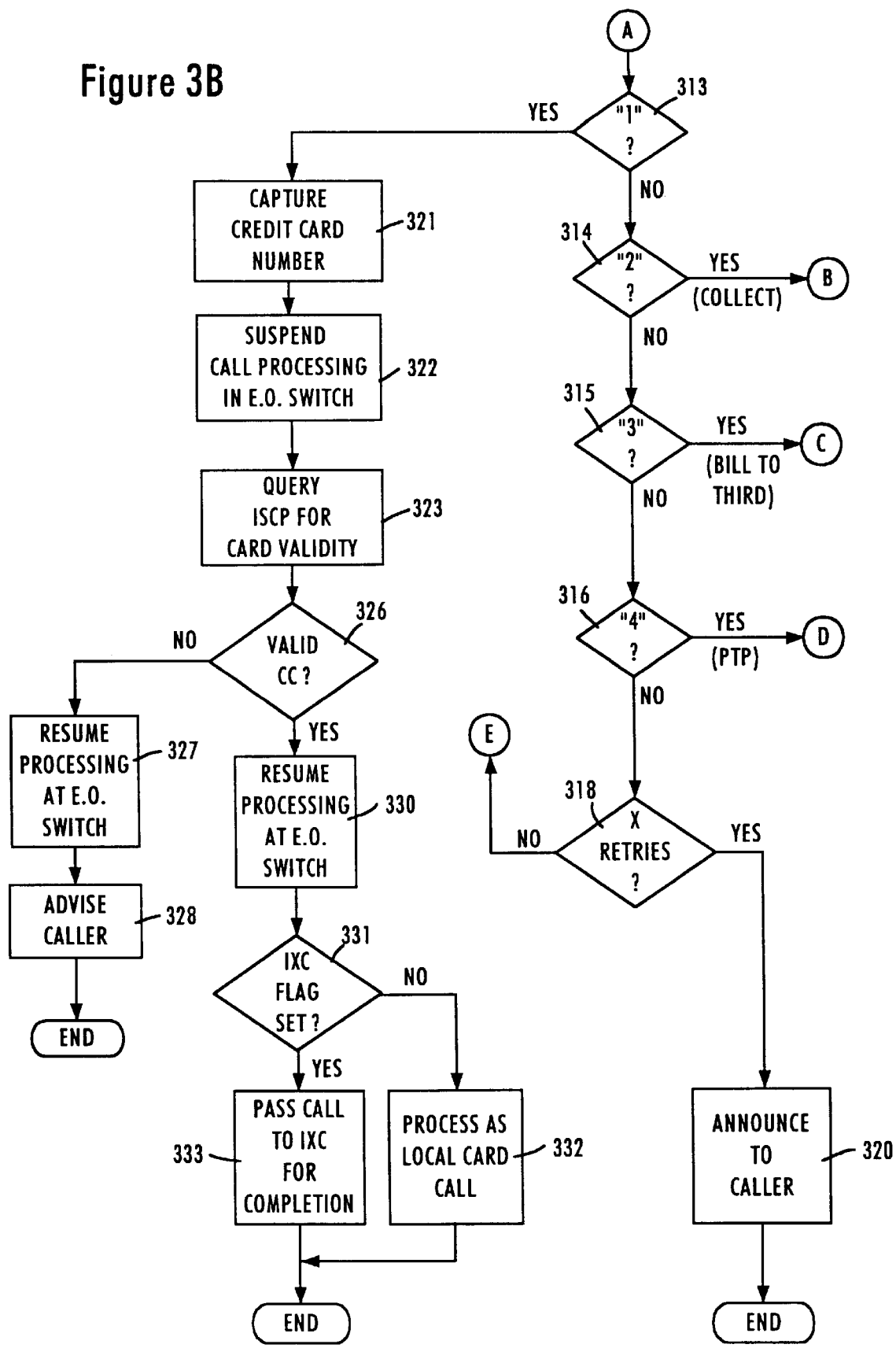
Figure 3C:
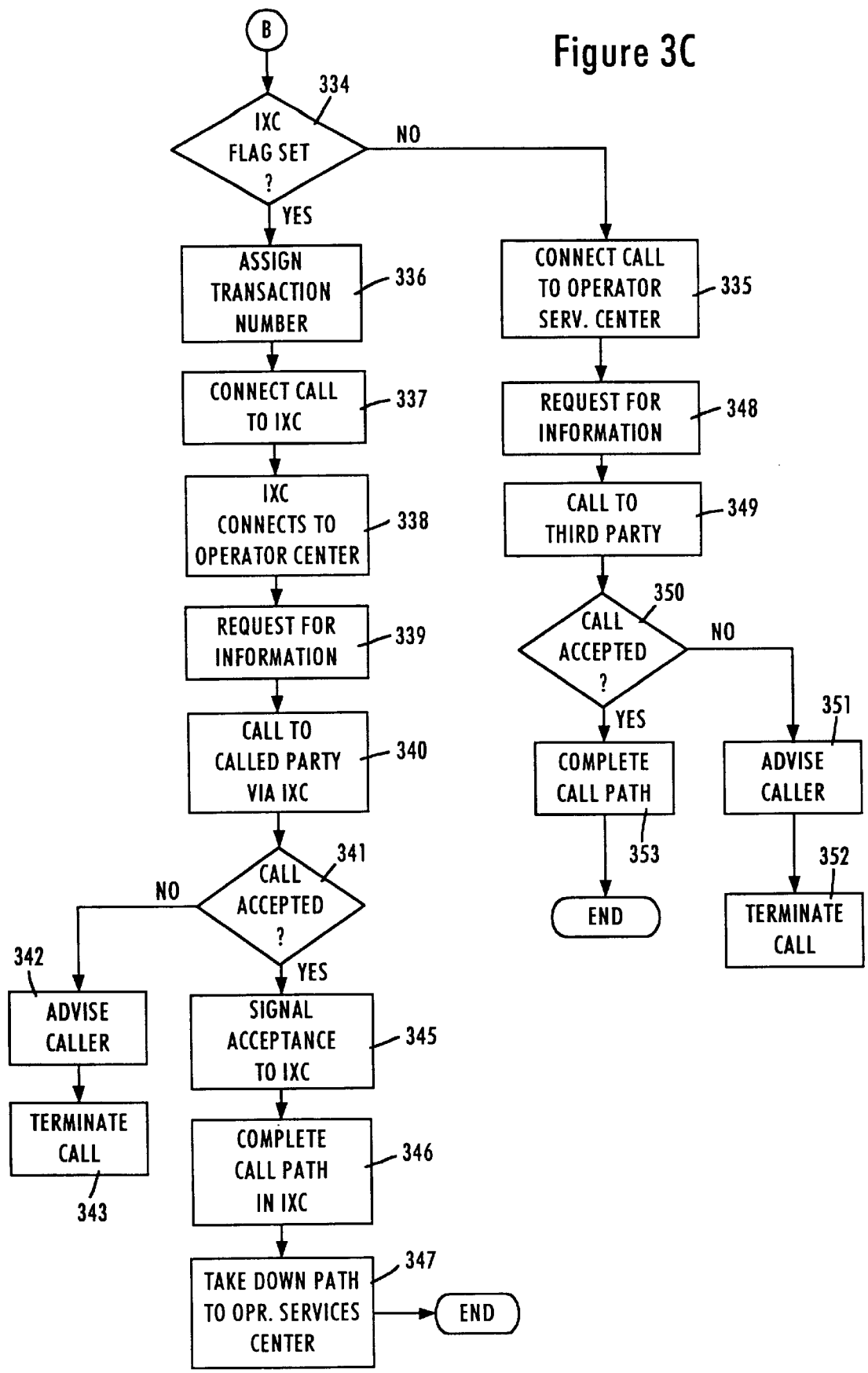
Figure 3D:
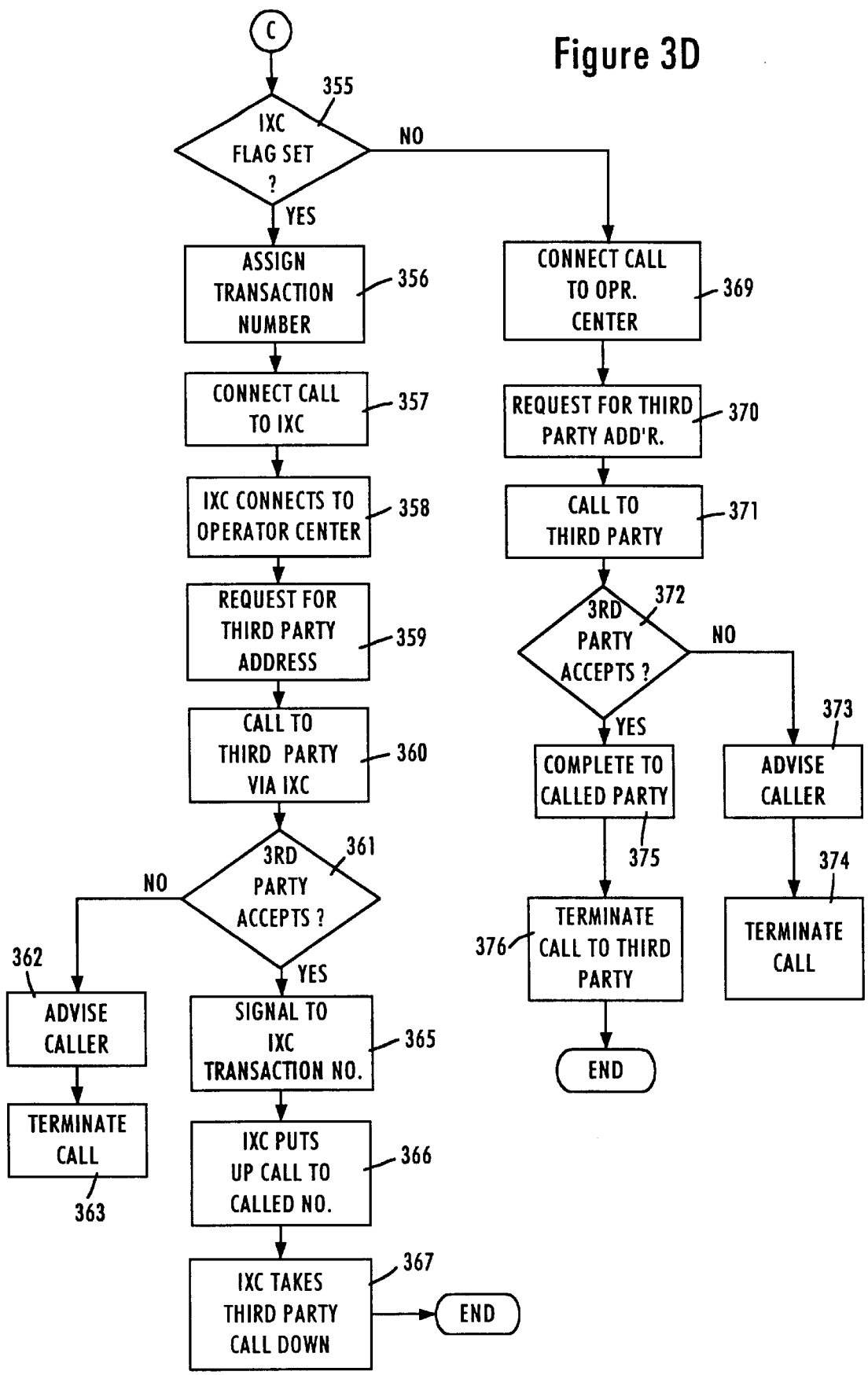

With the foregoing as a basis for understanding certain logical concepts, the system of FIG. 2 and the flow chart of FIG. 3 are next discussed together to provide a description of the invention in terms of various operator services that might be provided. Although these figures are useful to describe the invention in detail, it will be recognized that they too are simplified for explanation purposes, and that processing steps and system components and interconnections are concisely depicted for that reason. From these figures alone, however, those of skill in the art will readily understand the invention. Those instances in the figures wherein such things as routine processing steps, equipment substitutions, and redundancies are desirable for practical purposes will be apparent.

Structurally, FIG. 2 shows an interexchange carrier network 201 interconnected for exchanging telecommunications with multiple telephone system end-offices 203–206 by trunking systems 207–210, respectively. The interexchange carrier network 201 may extend over a wide geographic area (e.g., nation-wide) and the end-offices 203–206 may each be operated by different local telephone companies (TELCOs), although that need not be the case. Thus, certain of the end-offices may be operated by the same TELCO and they may be interconnected by a trunking system between offices such as by the trunk 202 between end-offices 203 and 204. The end-offices 203–206, as is conventional, are interconnected through local loops 211–214 to telephone stations 215–218, respectively. Generally, for discussion, unless otherwise indicated by the context, the various operator services will be considered for a call that is desired to be placed from station 216 (the calling station) to station 218 (the called station) if the call is not intra-LATA, and from station 216 to station 215 if the call is intra-LATA.

It is assumed that all operator services not provided by operations carried out through an end-office (i.e., those for which prior approval is required for call completion), whether for long distance calls or for intra-LATA calls, are provided by an operator services platform 220 operated by the local exchange carrier that operates end-office 204 through which the call originates. Preferably, for IXC calls, the operator service platform 220 is accessed and configured with signaling and other connections as discussed in the aforementioned Robert P. Florindi et al. application, referenced above, the disclosure of which is incorporated herein by reference. Thus, calls passing to the IXC network 201 with operator services yet to be provided are routed through the IXC network 201 to a point-of-presence (POP) 222 maintained by the IXC in the LATA where the operator service platform 220 is located. The POP 222 connects those calls to the operator services platform 220, preferably through a Feature Group D trunk 224. This arrangement allows information about the call, including the identity of the calling station 216, the called station 218, and an indication of the operator service required to be directed to the operator services platform 220. Intra-LATA calls that require operator services other than those available through end-office operations are routed to the operator service platform 220 in a conventional manner by way of a operator service trunk (OSS) 226 which also carries information regarding the calling and called stations and the operator service expected.

The operator service center 220 may be conventional in its make-up, although in many respects, due to the invention's operation, it is relieved from performing certain services otherwise expected to be carried out by an operator service system. For example, by the invention, a menu of services may be presented from the end-office 204 in the first instance, as opposed to generating the menu in the operator platform after the call has reached it. Conventionally, the operator service platform 220 may include operator terminals (manual and automated), pertinent databases, and billing and other systems as required for providing operator services (these are not illustrated). Additionally, the operator service platform 220 is connected through a signaling system to the IXC network 201; this signaling system comprises a data link 228 from the platform 220 to a first signal transfer point (STP) 229, an intermediate data link 230 from STP 229 to a second signal transfer point 231, and a final data link 232 from STP 231 to the IXC network 201. This signaling system, as are other signaling links and systems described herein, is preferably in conformance with the standard Signaling System 7, and it may be a portion of a larger signaling system for out-of-band signaling (as is well known) and operation in an advanced intelligent network (AIN) arrangement, as is also well known.

The end-office 204 which receives the call from the originating station 216 includes a service switching point (SSP) 234, and it is operative thereby to recognize certain AIN type triggers that may arise during the call processing. In this instance, while a call is being handled, the SSP 234 will detect the need for any of those certain operator services that can be performed by operations carried out through the end-office 204 (including peripherals thereto). It will also detect other triggers that may arise as the service is being performed. Upon detection of a trigger the SSP responds by launching a query message to a database to request information and data needed for providing the required service. For that, the SSP 234 is connected via a data link 236, a signaling transfer point (STP) 238, and another data link 240 to an integrated service control point (ISCP) 242. This is an AIN configuration in which the ISCP 242 is a database system accessible by the SSP 234 through the data links 236 and 240 and the STP 238 for the production of the information, commands, and data required for the end-office 204 (again, including its peripherals) to provide those certain operator services which can be provided without calling upon the services of an operator services platform.

To facilitate the provision of those services, the end-office 204 includes peripheral equipment such as an interactive audio response unit 245 to provide for vocal interaction with a caller at the calling station 216 (as by the presentation of a menu, requests for entry of numerical data, detection of DTMF inputs, etc.) and a coin detection unit 247 to facilitate processing of coin-paid calls (i.e., in the case where calling station 216 is a pay phone). Other peripheral equipment besides that illustrated may be employed and called upon by the SSP switching means 234, depending on the particular services to be supported from the end-office 204. For example, in some cases the end-office may be equipped with voice recognition equipment that will be used in providing the services. As is well known, the various items of peripheral equipment can be connected into the call by the switching means of the end-office (i.e., the SSP equipped switch) as needed.

Operationally, beginning with step 300 (FIG. 3A), upon the arrival of a call at the end-office 204, as from calling station 216, there are a series of steps 301–303 to determine if the call includes an overt request for the services of an operator. That is, in step 301 a check is made to see if 00 has been entered from the calling station 216 as an indication that inter-LATA operator services are requested. If not, then step 302 follows to determine if a 0+ number has been entered; and, finally, if not a 0+ call, then step 303 is operative to detect the entry of 0– as a request for the services of a local exchange operator. In the first case, at step 301, if a 00 is detected, then step 304 operates to set an IXC flag as an indicator, for subsequent reference, that the call is an interexchange call (the caller has requested the services of an IXC operator). On the other hand, if step 302 is reached, and the call is determined to be a 0+ call (a "yes" result in step 302), then step 305 follows to determine if the call is an intra-LATA call or not. This is determined by an analysis of the dialed digits that follow the 0 in the same way that the dialed digits of any other, non-operator service call are routinely analyzed to see if that call is intra-LATA or not. If it is determined in step 305 that the call is not intra-LATA, then step 304 is also used in that case to cause the IXC flag to be set.

In the event there is no overt request for operator services, there follows a series of steps 306–309 by which the receiving switching means (e.g., SSP 234) determines if the call needs operator services as a coin-paid call. A coin-paid call is one that is paid for, at a rate based on time and distance, by depositing coins in a pay-phone to purchase a fixed calling time. Among other things, a caller is advised of the amount to initially deposit, and the call is monitored for coin collection and time duration. A coin-paid call is typically recognized from the calling line, indicating that the calling station is a pay-phone (e.g., station 216), and from the dialed digits received from that phone. If the phone is a pay-phone, and if the call attempted is a toll call, then it is presumably a coin-paid call for which operator services are required. Thus, in step 306 a determination is made as to whether the dialed digits are preceded by the digit "1." Such a call is referred to as a "1+ call." If it is not a 1+ call, then it is logically realized at this point that no operator services are required and the process moves to step 307 by which conventional processing is afforded the call. On the other hand, if a 1+ is detected at step 306, step 308 follows and a determination is made as to whether the calling station 216 is a pay-phone. If it is not, then, again, the call is not one that needs operator services and it is directed to conventional toll call processing at step 309. If the call is determined to be a 1+ call from a pay phone, however, then operator service for a coin-paid call is required. That service is discussed in connection with FIG. 4.

In these cases, if there is an indication from any of steps 301–303 that operator services are called for, then step 311 follows to cause a vocal menu of services available to be presented at the calling telephone 216. The menu may be generated from the end-office 204 by the SSP switching means 234 causing the audio response unit 245 to be connected into the call. The service menu may, for example, advise the caller to "Please enter 1 for a credit card call; 2 for a collect call; 3 for billing the call to a third party; or 4 for a person-to-person call." Coin-paid calls, another of the operator service calls discussed here, need not be menu announced.

There follows (FIG. 3B), then, steps 313–316 to detect which, if any, selection has been made from the menu. That is, in step 313 it is determined whether a 1 has been entered as a menu selection, and if not, then step 314 follows to look for entry of a 2. Similarly, step 315 follows step 314, looking for entry of a 3 if neither 1 nor 2 has been detected, and step 316 follows step 315, looking for entry of a 4 if no other entry has been made. The order of detection is not important. Finally, at step 318, as a practical matter, a sub-processing step may be included to allow a caller to recycle through the menu (back to step 311) and selection process in the event of erroneous entries, time-outs without entries and so forth. This can be limited to some reasonable number of retries to allow a caller to make use of the system, but to avoid misuse. If the retries become excessive without detection of at least one of the menu selections, an announcement will be given to the caller at step 320 advising that the call must be concluded and the call is terminated. As will be recognized, step 318 is a condensation of operations typically found in call processing of this kind, desirable for on-line use, but not requiring detailed explanation for an understanding of the invention. It will also be recognized throughout that other such routine processing, or sub-processing, steps are omitted from the drawings or are shown very concisely for better focus on the invention. The need for these at various points in the overall process and the details of their implementation will be apparent to those of skill in the art.

The processing of the call has, to this point, taken place within the end-office 204. Depending on the menu selection and whether the call is a coin-paid call, the call may next be directed to an operator services platform (through an IXC network if not intra-LATA) or it may be processed within, or by, the end-office 204 with access to information required for that from the ISCP 242. Each service will be considered in turn.

If the call from station 216 is a credit card call, then the caller enters 1 from the dual-tone multi-frequency (DTMF) keypad of the telephone, indicating the menu selection, which is detected at step 313. With the service identified, at step 321 the caller is requested to enter a credit card number to which the call is to be billed (and perhaps a personal identification number). The number, or numbers, entered are captured by the switch 234. It is then triggered to suspend its processing of the call (step 322) and to launch a query message to the ISCP 242 (step 323), providing the credit card number and other information as required (e.g., a PIN number). The query message, in effect, requests that the ISCP 242 determine whether the card number can be accepted for charging the call to and that the SSP switch be advised accordingly in a response message. The validity (i.e., acceptability) of the credit card is indicated to be determined in step 326. For this, the ISCP 242 includes a database whose contents are indicative of which card numbers are acceptable for billing calls to and which are not; the techniques for establishing and maintaining credit card validation databases are now well known and need not be discussed in detail. The response message provided by the ISCP 242, indicating whether the call can be completed or not, is returned to the end-office switch 234. The query and response messages pass between the ISCP 242 and the end-office switch 234 via the STP 238 and data links 236, 240.

If the call is to be denied because the card number is unacceptable, then the switch resumes processing at step 327 but only to advise the caller in step 328 that the call cannot be accepted. As those of skill in the art will appreciate, other steps, not illustrated, may be used at this point to allow the caller access to other services or to re-enter a credit card number for re-attempting the call. If the credit card is approved for the call, however, the response message will indicate that, and the switch 234 will resume call processing at step 330 for completing the call. Following step 330 a check is made in step 331 to see if the call is an intra-LATA call or not. It will be recalled that, at step 304, earlier in the process, a flag is set for a call if it is to be passed to an IXC carrier. If the call is intra-LATA (i.e., the IXC flag is not set), then step 332 is operative and the SSP switch 234 routes the call from the end-office 204 to another end-office within the same LATA (as by trunk 202 to end-office 203). If, however, the IXC flag is set, the end-office switch, in step 333, routes the call to an interexchange carrier network with the credit card operator service having already been provided. Since, in many situations there will be a number of interexchange carrier networks which might be the recipient of the call, the appropriate one may be determined from the record in the ISCP database associated with the credit card number and with other identifying data provided as caller inputs or it may be determined from a presubscription of the calling line to a particular carrier. The identity of the appropriate IXC carrier, if determined in the ISCP 242, can be included in the response message. In this case, for illustration, the carrier network identified, whether from the calling card data or from a presubscription, is IXC network 201. Thus, although the LEC may retain responsibility for billing of the call, the call is passed to the IXC network 201 as would a long distance call not requiring operator services.

If the call is desired to be placed as a collect call, then the caller enters 2 from the selection menu. This entry is detected within the end-office 204 at step 314 causing the process to move to step 334 (FIG. 3C) whereby it is determined from the state of the IXC flag whether the call is intra-LATA or not. Since the operator service for the collect call entails operations to determine call acceptance (i.e., prior approval for charges) at the called station 218 (or station 215, if intra-LATA), no AIN trigger will be presented to the end-office SSP 234, and the call will need to be passed to a service provider separate from the end-office 204 to obtain the needed services. If the IXC flag is set, indicating that the call is not intra-LATA, then a transaction number is assigned to the call in step 336 for call identification in subsequent processing, and the call is passed, via trunk 208, to IXC 201 in step 337. The call is passed to the IXC network 201 without operator services having been provided, but with signaling information indicative of the need for services and the call's transaction number. On the other hand, if the call is determined in step 334 to be intra-LATA, then step 335 will cause it to be passed to the operator service platform 220 via OSS trunk 226 for the provision of the requested service.

Within the IXC 201, the call is routed, along with related information received from the end-office 204, such as the directory number of the called station 218, to the IXC's POP 222. Then, by way of the Feature Group D trunk 224, the call is presented at the operator services platform 220. In the flow chart, this routing is indicated to be carried out by step 338. Once the call is at the operator services platform 220, the required service will be identified from the accompanying information, and voice contact is established between the caller and an operator station (live or automatic). At step 339 the caller's name is requested and recorded for playback later when approval for the call is sought at the called station 218. To determine acceptance or approval for the call, a call is placed back from the operator services platform 220 through the IXC network 201 to the called station 218. Once the call path from the operator service platform 220 to the called telephone 218 is complete, the operator platform 220 announces the name of the calling party (in the caller's voice) and asks a responding party at telephone 218 whether the collect call will be accepted. These operations are shown together condensed into step 340 of the process, and acceptance or non-acceptance of the call is indicated in step 341. If the call will not be accepted, then step 342 follows by which the operator services platform 220 advises the caller of the non-acceptance. The call is then terminated by operation of step 343. Alternatively, in a conventional manner, the caller can be offered other calling services or access to a live operator.

If the collect call is accepted, then step 345 follows, and, preferably, in the manner disclosed in the aforementioned Robert P. Florindi et al. application, the operator services platform formulates and sends a message to the IXC network 201 signaling that the call has been approved. The message is preferably in a standard TCAP format and will include the call's transaction number for identification. Actions are then taken in the IXC network 201, in step 346, to maintain the call connections through the IXC network to the end-office 206 serving the called station 218 and to take down the call path to and from the operator services platform 220. This avoids bridging the call legs together in the operator services platform 220 for the duration of the call and allows these legs, to and from the operator services platform 220 through the POP 222 and trunk 224, to be switched out of the call path (shown by step 347). The approval signal indicating that the call can be completed or maintained in this manner passes to the IXC network 201 from the operator services platform by way of the signaling system comprised of the STPs 229 and 231 and data links 228, 230 and 232.

If the collect call is passed to the operator service platform 220 as an intra-LATA call in step 335, then certain standard processing follows, similar to the conventional aspects of that just described for the case where the call is not intra-LATA. The intra-LATA collect call processing will therefore only be briefly described. This includes, at step 348, a request for the caller's name so that it can be recorded for playback when acceptance is sought for the call. Following, in step 349, a tentative call is made to the calling station (assumed, as mentioned above, to be station 215) from the operator service platform 220 to request such approval. If the call is not accepted (step 350), then the caller is advised accordingly in step 351 and the call may be terminated (step 352). If the call is approved, however, it is caused to be completed in step 353 as is conventional for intra-LATA collect calls.

The service for billing a call to a third party begins at step 315 with the entry, for example, of the digit 3 from the service selection menu. In response, at step 355 (FIG. 3D), a check is made, of the IXC flag, to see if the call is intra-LATA or not. Since third party billing requires prior approval from someone at a third party telephone, no triggering event will be detected to indicate that the requested service is of a type which can be provided from the end-office 204. The call will therefore ultimately need to be directed to the operator service platform 220 for handling, either as an intra-LATA call or as an inter-LATA call.

If the call is not intra-LATA (i.e., the IXC flag is set), as determined in step 355, then step 356 follows and the call is assigned a transaction number for identification in subsequent processing. Then, in step 357 the call, along with related call processing information, such as the transaction number and the identity of the needed service, are passed to the IXC 201. As described above for a collect call, the call is then routed in step 358 to the operator services platform 220. The operator services platform 220 responds in the third party billing mode of operation, and, in step 359 requests and records information from the caller for carrying out the third party billing operations. The information gathered includes the third party directory number and the caller's name; the directory number is needed for placement of a call to seek billing approval and for potential billing, and the caller's name is needed for announcement at the third party telephone when approval is sought. It may be desired, for example, to bill third party telephone station 217 for the call from calling station 216 to called station 218. Thus, in step 360 a call to the third party station 217 is made from the operator service platform 220 to see if billing will be accepted. Upon response at station 217, the caller's name is announced and a query made to see if the billing will be accepted. The determination of acceptance is thus made in step 361. If not accepted, then step 362 follows and the caller is advised accordingly. The call may be terminated at this point (step 363) or provision may be made for giving the caller access to other services or for trying third party billing alternatives. On the other hand, if the billing is indicated by step 361 to be accepted, step 365 follows causing a signaling message to be sent to the IXC network 201 from the operator services platform 220 by way of the signaling system interconnections between the two. As has been mentioned, the signaling system is comprised of the STPs 229 and 231 and data links 228, 230, and 232. The message (or messages), with reference to the call's transaction number, indicates that the call has been approved, and that actions can therefore be taken (step 366) within the IXC network 201 to complete the call to the called station 218. With the call completed, the call between the operator service platform 220 and the third party station 217 is then terminated at step 367.

If the call is determined at step 355 to be intra-LATA then step 369 follows and operates to cause the call to be connected into the operator service platform 220 as an intra-LATA call by way of the OSS trunk 226. The operator service provided is conventional for a bill-to-third-party call. Included in the operations is step 370 for requesting and recording the caller's name and the directory number of the telephone station, the account for which is desired to be billed and from which prior approval for the call is to be sought. With that information, a call is placed from the operator services platform 220 to the third party telephone in step 371, as is typically done for intra-LATA operator service calls of this type, and approval or acceptance is sought for charging the call. The third party telephone is not specifically illustrated in this case, but it could, for example, be any telephone connected to end-office 203 or 204. Whether the charges will be accepted or not is determined in step 372, depending on the response obtained from contact at the third party telephone. If the call is not accepted, then the caller can be advised of that by operation of step 373 and the call then terminated (step 374). If, however, the call charges are accepted at the third party telephone, step 375 follows the determination of acceptance at step 372, and the call is caused to be completed through the intra-LATA network to the called station (as from station 216 to station 215). The call from the operator service platform 220 to the third party station, if still in place, is terminated at step 376.

For economy in the description, the processing for a person-to-person call is not separately presented in FIG. 3. The operations are nearly identical to those for a collect call, however, and it should suffice therefore, with that in mind, to simply outline the operative steps for a person-to-person call. Reference may be made to the flow chart for collect call processing as may be helpful, keeping in mind the different purposes served by the two kinds of calls.

As with a collect call, a person-to-person call entails operations to determine call acceptance (i.e., prior approval) at the called station. In the case of a person-to-person call, however, acceptance relates not to charges for the call, but to whether a particular called party is available to receive the call from a particular calling party. No AIN trigger is presented to the end-office SSP 234 as a result of person-to-person processing, and the call will therefore need to be provided with the person-to-person service outside the end-office 204. If the call is intra-LATA it is passed to the operator service platform 220 by way of the OSS trunk 226 and the service is provided from there in a manner analogous to that for a collect call. If the call is not intra-LATA it is passed to the IXC network 201 without the services having been provided and the IXC is responsible for getting the call to an operator services platform. Whether the call is intra-LATA or not is determined initially at steps 301, 302, and 305, and at later steps as needed by examining the IXC flag, the status of which is fixed at step 304. If the IXC flag is set, indicating that the call is not intra-LATA, then a transaction number is assigned to the call, as with other calls passed to the IXC network 201. This is for call identification in subsequent processing.

The call is routed within the IXC 201, along with related information received from the end-office 204, such as the directory number of the called station 218, to the IXC's POP 222. By way of the trunk 224, the call is presented at the operator services platform 220. At the operator services platform 220, the person-to-person service is initiated, and voice contact is established with the caller. The names of the caller and of the particular person being called are requested and then recorded for playback later when approval for the call is sought at the called station 218. To determine approval, a call is placed from the operator services platform 220 through the IXC network 201 to the called station 218. Upon response at the called station 218, it is announced that the call is person-to-person, the names of the calling party and the person to whom the call is directed are given, and a query is made as to whether the call can be accepted (in effect, whether the call is approved). If the call will not be accepted, then the caller is advised and the call can be terminated or alternative services offered at that point. If the person-to-person call is accepted, then, using the techniques described for a collect call, the operator services platform 220 sends a message to the IXC network 201 signaling that the call has been approved. The IXC network 201, in response, causes the call connections to the called station 218 to be maintained and those to the operator services platform 220 to be taken down. Again, this avoids having to bridge the call legs together in the operator services platform 220 and maintain the bridge for the duration of the call.

Figure 4A:
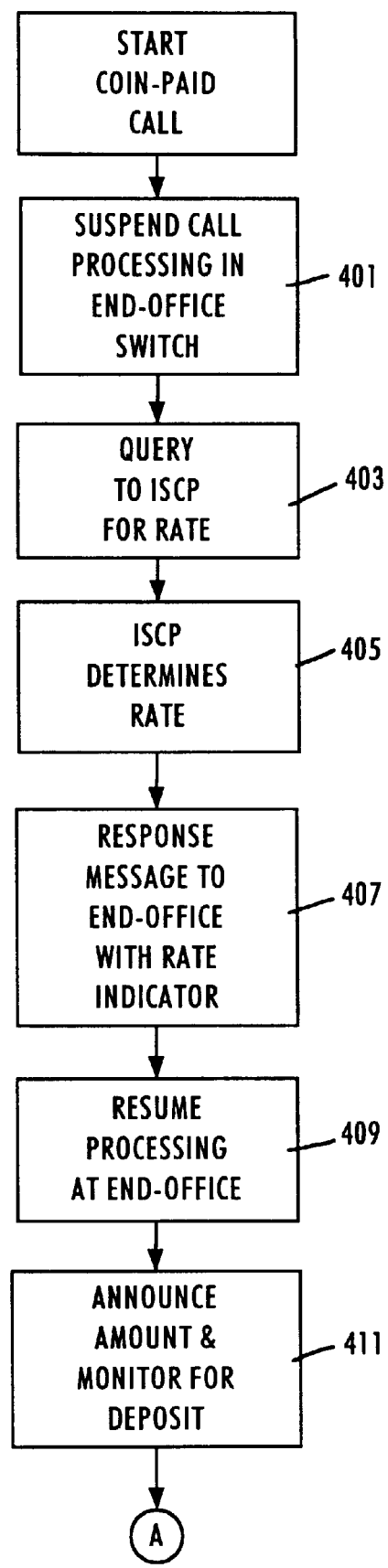
FIGS. 4A and 4B are flow charts, related to the block flow chart of FIG. 3, that illustrate operations for processing a coin-paid call in accordance with the invention.
Figure 4B:
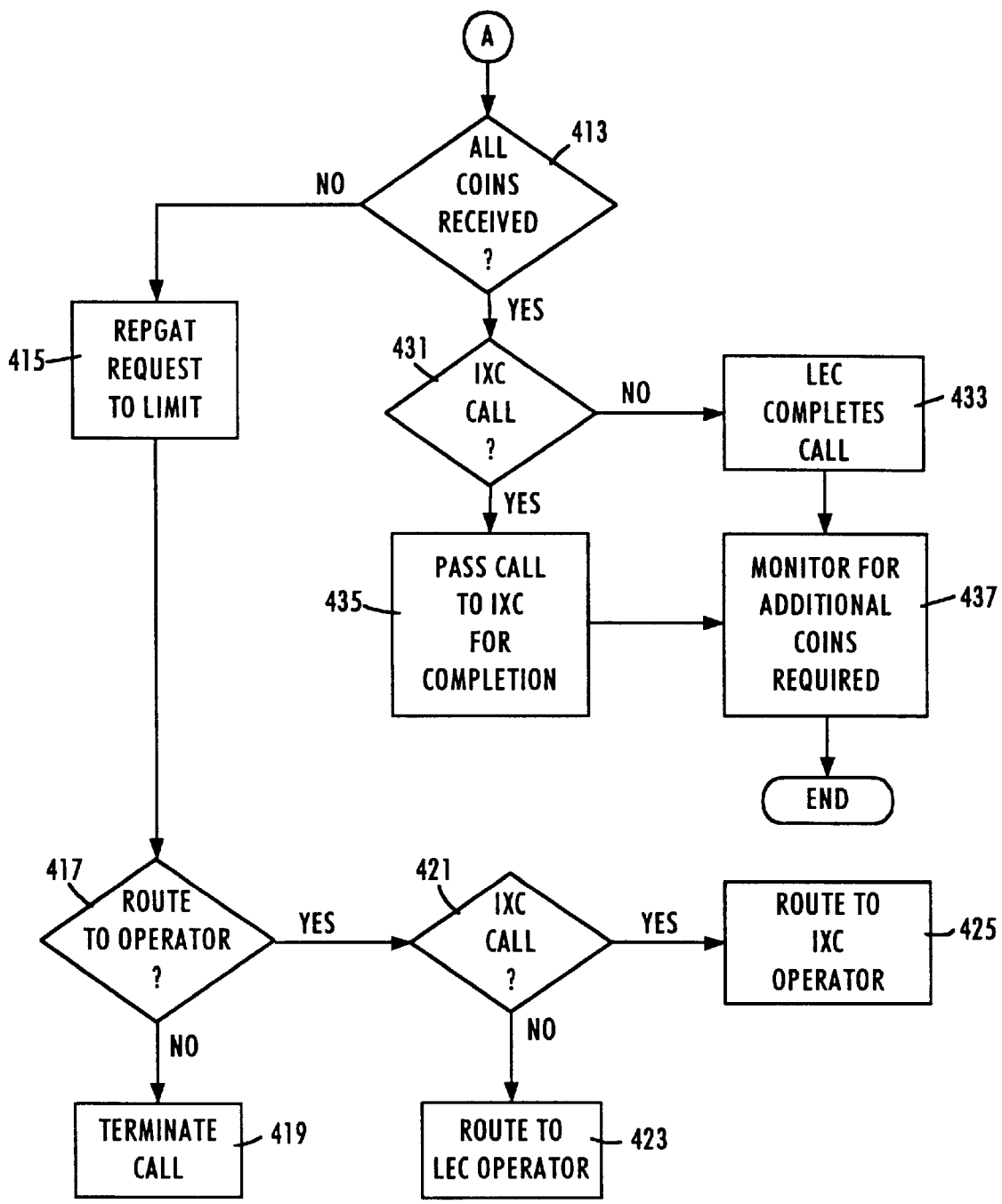

FIG. 4 is referred to for a discussion of the processing for a coin-paid call; e.g., for a call from station 216, where station 216 is a pay-phone and the call is to be paid for by the deposit of coins into the phone. A coin-paid call is characterized by its placement from a pay-phone (identified by the calling station line) and the fact that the telephone number dialed is preceded by the digit "1." It is a "1+ call" made from a pay-phone. The confluence of factors characterizing the call (recognized at steps 306 and 308, FIG. 3A) acts as a trigger in the AIN equipped end-office switch (SSP 234) causing it, in step 401, to suspend its processing of the call. The SSP is adapted to detect this trigger condition because the operator services for a coin-paid call are of a type that do not require approval or acceptance of the call at a telephone station other than the calling station 216. The services are therefore to be performed by or through the end-office 204 without passing the call to another service provider or to an operator service platform.

Once triggered for this service, in step 403, the SSP 234 formulates and sends a query message to the ISCP 242 to obtain therefrom the rate that is to be charged for the call, at least for some initial time period. To enable the ISCP 242 to determine the appropriate rate, the query message includes the calling party telephone number, the called party number, and an identification of the IXC that will carry the call in the event it is not an intra-LATA toll call. The IXC identified is the one to which the calling station 216 is presubscribed, although other carriers might be selected by a caller's entry of a particular carrier's access number. The ISCP 242, using the information of the query message for entry into rate tables which it contains, determines in step 405 the rate to be charged for the call. Rater systems are well known, having been used in operator service centers in support of coin-paid calls for some time; thus the rater that is incorporated into the ISCP 242 may conveniently be adapted from those systems. The ISCP 242 then puts together a response message, or messages, containing the rate information appropriate for the call and sends it to the SSP 234 (step 407). The messages are exchanged between the ISCP 242 and the end-office switch 234 through the STP 238 and data links 236 and 240.

Upon receipt of the ISCP response message the SSP resumes its processing of the call and causes appropriate peripheral equipment, such as audio response unit 245 and coin detection unit 247, to be connected into the call (step 409). At step 411 the rate information obtained from the response message is used as inputs to both of these units, first causing an announcement to be played by the audio unit to the pay-phone 216 relating the amount to be deposited for an initial calling period and then causing the phone line to be monitored by the coin detect unit to see if the required amount is deposited. A determination follows at step 413 to see if the correct amount has been deposited. If there is no deposit, or if the deposit is not for the correct amount, the caller may be advised of that at step 415 and given an opportunity to complete the deposit. This may be handled by recycling through the announcement and coin detection steps of the process, using standard programming techniques (not illustrated), to give the caller repeated opportunities to make the deposit. If after a prescribed number of attempts there has not been a sufficient deposit, a determination is made at step 417 whether to route the call to an operator. If not, unused deposits can be returned to the caller and the call terminated at step 419. If the call is to be routed to an operator, step 421 determines from the IXC flag whether or not the call is intra-LATA. Intra-LATA calls will be directed to LEC operators (step 423), while non-intra-LATA calls are routed to IXC operators (step 425).

If the deposit is found to be correct in step 413, however, then step 431 follows to determine, from the IXC flag, if the call is intra-LATA or not. If it is intra-LATA, step 433 is taken up and the SSP switch 234 routes the call accordingly. If the call is not intra-LATA, on the other hand, step 435 results in it being passed to the IXC network 201 with the service already having been provided by the end-office operations and without the need for billing by the IXC. Once the call is completed, whether intra-LATA or not, it continues to be monitored in the end-office 204, as by the coin detect unit 247, to determine if additional deposits are needed to continue the call beyond the period paid for and to cause termination as needed (step 437).

While the foregoing describes the invention in detail and sets out its preferred form, it will be recognized that the invention may take many and diverse embodiments, that various modifications may be made therein, and that it may be implemented with various combinations of hardware and software, and, further, that the operations carried out by the invention, although generally depicted as being sequential, may in some cases be carried out simultaneously, or nearly so, and that the precise order of performance may be unimportant or even reversed in some instances without departure from the inventive concepts. It is intended to claim all such modifications and variations which fall within the true spirit and scope of the invention.

We claim:

1. A method for providing an operator service for processing a telephone call originating from a calling station, comprising the steps of:
   (a) receiving the call at an end-office;
   (b) determining if the call requires operator service for placement as a coin-paid call, and if it does, then providing that operator service by operations conducted through the end-office, comprising the further step of accessing an advanced intelligent network (AIN) database by the end-office;
   (c) if the call is not a coin-paid call, then presenting a menu of available operator services at the calling station from which a particular service can be selected;
   (d) for an operator service selected from the menu, determining if that service requires prior approval for completion of the call to be obtained at a subscriber station other than the calling station;
   (e) if it is determined that the selected service requires such prior approval for completion of the call, then passing the call from the end-office to a separate service provider from which the selected operator service is then provided for the call; and
   (f) if it is determined that the selected service does not require such prior approval for completion of the call, then providing the selected operator service for the call by operations conducted through the end-office, comprising the further step of accessing the AIN database by the end-office.

2. The method of claim 1, including the further step of:
   determining at the end-office if the call is an intra-LATA call or not; and
   wherein, step (b) further comprises passing the call to an interexchange carrier network for call completion following the provision of the coin-paid call operator service if it is determined that the call is not an intra-LATA call.

3. The method of claim 2, wherein step (f) further comprises passing the call to an interexchange carrier network for call completion following the provision of the selected operator service if it is determined that the call is not an intra-LATA call.

4. The method of claim 3, wherein the separate service provider of step (e) is an interexchange carrier network if it is determined that the call is not an intra-LATA call.

5. The method of claim 4, where in the menu of available operator services includes at least one of (i) a service for charging the call to a credit card; (ii) a service for collect calling; (iii) a service for billing the call to a third party; and (iv) a service for person-to-person calling.

6. The method of claim 5, wherein if the call is not an intra-LATA call step (e) further comprises:
   (e1) providing the interexchange carrier network with information pertaining to the call, including an identity of the calling station, an identity of a called station to which the call is desired to be placed, and an identity of the selected operator service;
   (e2) connecting the call from the interexchange carrier network to a point of presence (POP) of the interexchange carrier network maintained within a local access transport area (LATA);
   (e3) connecting the call from the POP to an operator services facility within the LATA by a trunking system having a signaling capability providing the identity of the calling station, the identity of the called station, and the identity of the selected operator service;
   (e4) communicating with a caller at the calling station and providing said operator service for completing the call in accordance with the selected operator service, using the calling station identity and the called station identity as required to provide the service; and
   (e5) completion of the call through the interexchange carrier network in accordance with the selected service.

7. The method of claim 6, wherein in said substep (e5) of completing the call further comprises transmitting a signal over a signaling network to the interexchange network from the operator services facility.

8. The method of claim 7, including the further substep of:
   (e6) signaling to the interexchange carrier network via the signaling network to cause the connection of the call to the POP and the operator services facility to be discontinued without discontinuing the completion of the call to the called station.

9. The method of claim 8, wherein the trunking system connecting the call from the POP to the operator services facility is a Feature Group D trunking system.

10. A system for processing a telephone call for which one of a plurality of available operator services is required in order to complete the call, comprising:
(a) a telecommunications switching means for receiving the call from a calling station and for receiving information from said station to indicate the service required for completing the call, said switching means being adapted (i) to provide at least one of the plurality of operator services through its own operations, (ii) to route the call from the switching means to an operator service provider for provision of the required service unless a trigger is first detected indicating that the required service is to be provided through said operations, and (iii) to detect such a trigger and to thereupon suspend processing of the call and formulate a request for information required for carrying out said operations;
(b) a database system accessible by the switching means while the processing of the call is suspended by the switching means, said database system being adapted to receive the request for information from the switching means, to determine the information required for carrying out said operations, and to return said required information to the switching means; and
(c) wherein the switching means is further adapted to resume processing of the call upon receipt of the required information and to carry out the operations so that the required operator service is thereby provided.

11. The system of claim 10, wherein the trigger is indicative of one of said plurality of available operator services other than one that requires prior approval for completion of the call to be obtained by contact with a subscriber station other than the calling station.

12. The system of claim 11, wherein the switching means is further adapted (i) to cause a menu of at least some of the available operator services to be presented at the calling station for selection therefrom of one the presented services as the required service, and (ii) to respond to entry of a selection from the menu by taking actions leading to provision of the selected operator service.

13. The system of claim 12, wherein the operator services which the switching means is adapted to provide through its own operations include a service for credit card calling and a service for coin-paid calling.

14. The system of claim 13, wherein the operator service provider to which the call is routed for provision of the required service is (i) an interexchange carrier network if the call is other than an intra-LATA call, and is (ii) an operator service platform of an intra-LATA carrier network if the call is an intra-LATA call.

15. The system of claim 14, wherein the switching means is further adapted, once the operations for provision of the required service have been carried out, to pass the call to an interexchange carrier network if the call is other than an intra-LATA call.

16. The system of claim 15, wherein the database system is an element of an advanced intelligent network (AIN) accessible by the switching means by way of signaling data links used within the AIN, and the information provided by the database includes credit card verification if the required operator service is for credit card calling and includes rate information if the required operator service is for coin-paid calling.

17. A method for providing operator services for a telephone call, comprising the steps of:
(a) receiving the call at an end-office from a calling station;
(b) presenting at the calling station a menu of optional operator services from which one of the services is selected according to which the call is desired to be processed;
(c) determining whether the selected service entails acquisition at a subscriber station other than the calling station of approval for the call prior to its completion to a called station;
(d) if the selected service does not entail such approval prior to completion, then performing the selected service for the call from the end-office through access to advanced intelligent network (AIN) facilities for obtaining information used to provide the service; and
(e) if the selected service does entail approval prior to completion, then routing the call from the end-office to an operator service platform from which the service is performed, the routing being by way of an interexchange carrier network if the call is not an intra-LATA call.

18. The method of claim 17, wherein if the selected service is performed in accordance with step (d), then thereafter processing the call as a plain old telephone service (POTS) call.

19. The method of claim 18, wherein the menu of optional operator services includes at least one of: (i) a credit card service, (ii) a collect call service, (iii) a bill-to-third-party service, and (iv) a person-to-person service.

20. The method of claim 19, including the further steps of:
(f) if the call is routed to an operator service platform by way of an interexchange carrier network, then following an acquisition of approval for the call, sending a signaling message from the operator service platform to the interexchange carrier network to indicate such approval; and
(g) in response to receipt of the signaling message by the interexchange carrier network, taking action therein to complete the call within the interexchange carrier network and to discontinue the routing of the call to the operator service platform.

21. A method for providing operator service for a telephone call regardless of whether the call is an intra-LATA call or not, comprising the steps of:
(a) at an end-office of a local exchange carrier, receiving the call from a calling station;
(b) determining whether the operator service to be provided entails acquisition at a subscriber station of approval for the call prior to its completion to a called station;
(c) determining whether the call is an intra-LATA call or not;
(d) if the operator service does not entail approval at a subscriber station prior to completion of the call then performing the operator service at the end-office by obtaining information required for that purpose from an advanced intelligent network (AIN) system and routing the call from the end-office for completion in accordance with the service performed; and
(e) if the operator service entails approval at a subscriber station prior to completion of the call then routing the call to an operator service facility of the local exchange carrier and performing the selected service at said facility, said routing being by way of an interexchange network to facilitate completion of the call if it is other than an intra-LATA call.

22. The method of claim 21, wherein prior to step (b) a menu of optional operator services is presented at the calling station from which the service to be provided may be selected.

23. The method of claim 22, including the additional steps, following step (a), of:

(i) determining if the call is a coin-paid call;

(ii) if the call is a coin-paid call then performing the operator service required for such a call at the end-office by obtaining information required for that purpose from the advanced intelligent network (AIN) system and routing the call from the end-office for completion in accordance with the service; and wherein the menu of optional operator service is presented and steps (b)–(e) are performed only if the call is not a coin-paid call.

24. The method of claim 23, including the further steps of:

(f) if the call is routed to the operator service facility by way of an interexchange network, then following an acquisition of approval for the call, sending a signaling message from the operator service facility to the interexchange network to indicate such approval; and (g) in response to receipt of the signaling message by the interexchange network, taking action therein to complete the call within the interexchange network and to discontinue the routing of the call to the operator service facility.

25. The method of claim 24, wherein the menu of optional operator services includes at least one of: a credit card calling service, a collect calling service, a bill-to-third party calling service, and a person-to-person calling service.

26. A method for processing a telephone call originating from a calling station and requiring an operator service for completion, comprising the steps of:

(a) receiving the call at a telephone office switch;

(b) determining if the operator service required for the call is of a type whereby an approval for completion of the call needs to be secured from a subscriber station other than the calling station in order for the call to be completed to a called station;

(c) if the required operator service is of a type other than one for which said approval needs to be secured, then providing the required operator service by operations conducted through the telephone office switch, said operations including (i) suspending processing of the call by the switch; (ii) accessing a database and obtaining information therefrom for providing the required service; and (iii) resuming processing of the call by the switch using the information obtained from the database to carry out said required operator service; and (d) if the required operator service is of a type for which said approval needs to be secured, then directing the call from the switch to an interexchange carrier network for provision thereby of said required operator service if the call is other than an intra-LATA call and directing the call to a local exchange carrier operator services station and providing the required operator service by operations conducted at said operator services station if the call is an intra-LATA call.

27. The method of claim 26, wherein in step (b) the operator service type for which an approval for the call must be secured from a subscriber station is determined from the group consisting of a collect calling service, a bill-to-third-party calling service, and a person-to-person calling service.

28. The method of claim 27, wherein in step (c) the required operator service of a type other than one for which said approval needs to be secured is selected from the group consisting of a credit card calling service and a coin-paid calling service.

29. The method of claim 28, wherein the database accessed is within an advance intelligent network (AIN) arrangement and said database is accessible by way of a signaling system.

30. The method of claim 29, further including the steps of:

(e) if the call is directed to an interexchange carrier network in step (d), then passing the call from the interexchange carrier network to said local exchange carrier operator services station and providing the required operator service by operations conducted thereat;

(f) if approval for the call is secured as a result of said operator service provided in step (e), then sending a signaling message from the local exchange carrier services station to said interexchange carrier network indicating that the call has been approved for completion to the called station; and (g) in response to receipt of the signaling message by the interexchange carrier network, causing the call to be complete through the interexchange carrier network to the called station and discontinuing any connection of the call to the local exchange carrier operator services station.

31. A method for providing an operator service for processing a telephone call originating from a calling station, comprising the steps of:

(a) receiving the call at a telephone central office switch and determining if the call is an intra-LATA call or not;

(b) determining if the call requires operator service for placement as a coin-paid call and if it does, then providing that operator service by operations conducted through the switch, using information obtained by the switch from access to an advanced intelligent network (AIN) database to carry out said operations, and then passing the call to an interexchange network for call completion if the call is not an intra-LATA call;

(c) if the call is not a coin-paid call, then presenting a menu of available operator services at the calling station from which a particular service can be selected according to which the call is desired to be processed;

(d) for an operator service selected from the menu, determining if that service is of a type whose performance requires prior approval for completion of the call to be obtained at a subscriber station other than the calling station;

(e) if it is determined that the selected service requires such prior approval for completion of the call, then passing the call from the switch to an interexchange carrier network from which the selected operator service is then provided for the call if the call is not an intra-LATA call; and (f) if it is determined that the selected service does not require such prior approval for completion of the call, then providing the selected operator service for the call by operations conducted through the switch, using information obtained by the switch from access to the AIN database, and then passing the call to an interexchange carrier network for call completion if the call is not an intra-LATA call.

32. The method of claim 31, wherein step (e) further includes the following substeps if the call is passed to an interexchange carrier network in the performance of step (e):

(e1) providing the interexchange carrier network with information pertaining to the call, including an identity of the calling station, an identity of a called station to which the call is desired to be placed, and an identity of the selected operator service;

(e2) connecting the call from the interexchange carrier network to a point of presence (POP) maintained within a local access transport area (LATA);

(e3) connecting the call from the POP to an operator services facility within the LATA by a trunking system having a signaling capability providing the identity of the calling station, the identity of the called station, and the identity of the selected operator service;

(e4) communicating with a caller at the calling station and providing said operator service for completing the call in accordance with the selected operator service, using the calling station identity and the called station identity as required to provide the service; and (e5) causing the call to be completed through the interexchange network in accordance with the selected service.

33. A method for processing a telephone call, comprising the steps of:

(a) receiving the call at an end-office from a calling station;

(b) determining whether the call requires an operator service for completion to a called station;

(c) if the call requires an operator service, then determining whether the required service entails acquisition of approval for the call at a subscriber station other than the calling station prior to completion;

(d) if the service does not entail acquisition of approval for the call at a subscriber station prior to completion, then performing the operator service from the end-office through access to advanced intelligent network (AIN) facilities for obtaining information used to perform the service and then routing the call from the end-office for completion with the operator service having been provided; and (e) if the service does entail acquisition of approval for the call at a subscriber station prior to completion, then routing the call from the end-office to an operator services platform and performing the operator service therefrom, and then causing the call to be completed.

34. The method of claim 33, including the further step of determining whether the call is an intra-LATA call or not; and wherein, in step (e) if the call is not an intra-LATA call, then the routing of the call to the operator services platform is by way of an interexchange carrier network to facilitate the completion of the call.

35. The method of claim 34, wherein in step (d) if the service does not entail acquisition of approval for the call at a subscriber station prior to completion then the service is selected from the group consisting of: a credit card call service, and a coin-paid call service.

36. The method of claim 35, wherein in step (e) if the service does entail acquisition of approval for the call at a subscriber station prior to completion then the service is selected from the group consisting of: a collect call service, a bill-to-third party call service, and a person-to-person call service.

37. The method of claim 36, wherein if the call is routed to the operator services platform by way of an interexchange carrier network, then upon acquisition of approval for the call at a subscriber station, a signaling message is sent to the interexchange carrier network via a signaling system and responsive actions are taken within the interexchange carrier network to complete the call and to discontinue the routing thereof to the operator services platform.

38. A method for providing an operator service for a telephone call, comprising the steps of:

(a) receiving the call from a calling station at an office of a local exchange carrier;

(b) determining a type of operator service required for completion of the call to a called station;

(c) determining whether the call is an intra-LATA call or not;

(d) determining whether the required service entails acquisition at a subscriber station of approval for the call prior to its completion to the called station;

(e) if the required service entails approval at a subscriber station prior to completion of the call then passing the call to an operator service platform of the local exchange carrier for performance of the service if the call is an intra-LATA call and passing the call to an interexchange carrier network for provision of the service if the call is not an intra-LATA call; and (f) if the required service does not entail approval at a subscriber station prior to completion of the call then performing the service within the office of the local exchange carrier by accessing advanced intelligent network (AIN) facilities for obtaining information to perform the service, and then routing the call from the office for completion following performance of the service.

39. The method of claim 38, wherein the type of operator service required for completion of the call is selected from the group consisting of services for; (i) a pre-pay coin call; (ii) a charge card call; (iii) a collect call; (iv) a call for billing to a third party; and (v) a person-to-person call.

40. The method of claim 39, including the further step of:

(g) if the call is passed to an interexchange carrier network for provision of the service, then the interexchange carrier network further passes the call to the operator service platform of the local exchange carrier for performance of the service and the call is then completed through the interexchange carrier network following performance of the service.

41. The method of claim 40, wherein the call is passed from the interexchange carrier network to the operator service platform by way of a Feature Group D trunk.

42. A method for processing a telephone call originating from a calling station and requiring an operator service for completion, comprising the steps of:

(a) receiving the call at a telephone office switch;

(b) determining if the operator service required for the call is of a type whereby an approval for completion of the call needs to be secured from a subscriber station other than the calling station in order for the call to be completed to a called station;

(c) if the required operator service is of a type other than one for which said approval needs to be secured, then providing the required operator service by operations conducted through the telephone office switch, said operations including (i) suspending processing of the call by the switch; (ii) accessing a database and obtaining information therefrom for providing the required service; and (iii) resuming processing of the call by the switch using the information obtained from the database to carry out said required operator service; and (d) if the required operator service is of a type for which said approval needs to be secured, then routing the call from the telephone office switch to an operator services station and providing the required services by operations conducted thereat.

43. The method of claim 42, wherein step (d) includes a substep for determining whether the call is intra-LATA or not and wherein the call is routed to the operator services station by way of an interexchange carrier network if the call is not an intra-LATA call.

44. The method of claim 43, wherein in step (b) the operator service type for which an approval for the call must be secured from a subscriber station is determined from the group consisting of a collect calling service, a bill-to-third-party calling service, and a person-to-person calling service.

45. The method of claim 44, wherein in step (c) the required operator service of a type other than one for which said approval needs to be secured is selected from the group consisting of a credit card calling service and a coin-paid calling service.

46. The method of claim 45, wherein the database accessed is within an advance intelligent network (AIN) arrangement and said database is accessible by way of a signaling system.

47. The method of claim 46, including the further step of:
(e) if approval for the call is secured as a result of said operator service being provided in step (d) and if the call is not an intra-LATA call, then sending a signaling message from the operator services station to the interexchange carrier network indicating that the call has been approved for completion to the called station.

48. The method of claim 47, wherein actions are taken within the interexchange carrier network in response to the signaling message to cause the call to be complete through the interexchange carrier network and for discontinuing the route of the call to the operator services station.

* * * * *